United States Patent
Christoph et al.

(10) Patent No.: US 9,503,658 B2
(45) Date of Patent: Nov. 22, 2016

(54) METHOD FOR GENERATING AND EVALUATING AN IMAGE

(75) Inventors: Ralf Christoph, Giessen (DE); Ingomar Schmidt, Buseck (DE); Peter Winck, Herborn (DE)

(73) Assignee: WERTH MESSTECHNIK GMBH, Giessen (DE)

( * ) Notice: Subject to any disclaimer, the term of this patent is extended or adjusted under 35 U.S.C. 154(b) by 198 days.

(21) Appl. No.: 14/118,236

(22) PCT Filed: May 16, 2012

(86) PCT No.: PCT/EP2012/059157
§ 371 (c)(1),
(2), (4) Date: Feb. 21, 2014

(87) PCT Pub. No.: WO2012/156462
PCT Pub. Date: Nov. 22, 2012

(65) Prior Publication Data
US 2014/0192234 A1    Jul. 10, 2014

(30) Foreign Application Priority Data

May 17, 2011  (DE) .......... 10 2011 050 408
Jul. 18, 2011  (DE) .......... 10 2011 051 894
Dec. 21, 2011  (DE) .......... 10 2011 056 788

(51) Int. Cl.
| | |
|---|---|
| *H04N 5/265* | (2006.01) |
| *G01B 11/03* | (2006.01) |
| *H04N 5/232* | (2006.01) |
| *H04N 5/235* | (2006.01) |

(52) U.S. Cl.
CPC .......... *H04N 5/265* (2013.01); *G01B 11/03* (2013.01); *H04N 5/2353* (2013.01);
(Continued)

(58) Field of Classification Search
CPC .......... H04N 5/265; H04N 5/23277; H04N 5/23232; H04N 5/2353; H04N
(Continued)

(56) References Cited

U.S. PATENT DOCUMENTS 5,627,911 A    5/1997  Inumaru et al.
5,686,960 A *  11/1997  Sussman ............ G02B 26/106
                                                        348/218.1
(Continued)

FOREIGN PATENT DOCUMENTS

CN    101984463 A    3/2011
DE    10248779 A1    4/2004
(Continued)

OTHER PUBLICATIONS

International Search Report mailed Apr. 17, 2013, corresponding to PCT/EP2012/059157.
(Continued)

*Primary Examiner* — Timothy J Henn
(74) *Attorney, Agent, or Firm* — Ladas & Parry LLP

(57) ABSTRACT

A method for generating and evaluating an image of a section of an object using an optical sensor. To generate a bright image, individual images are recorded of a section, of which individual images at least some individual images overlap at least in part in each case, and that to generate the image, the individual images or signals are aligned with respect to one another and superposed to form an overall image as the image of the at least one section, so that the evaluation of the overall image is substantially restricted to the overlapping regions of the individual images and/or the evaluation of the overall image or of a part thereof is brought about on the basis of the overlapping regions of the individual images having the latter.

24 Claims, 13 Drawing Sheets

Figure 1:
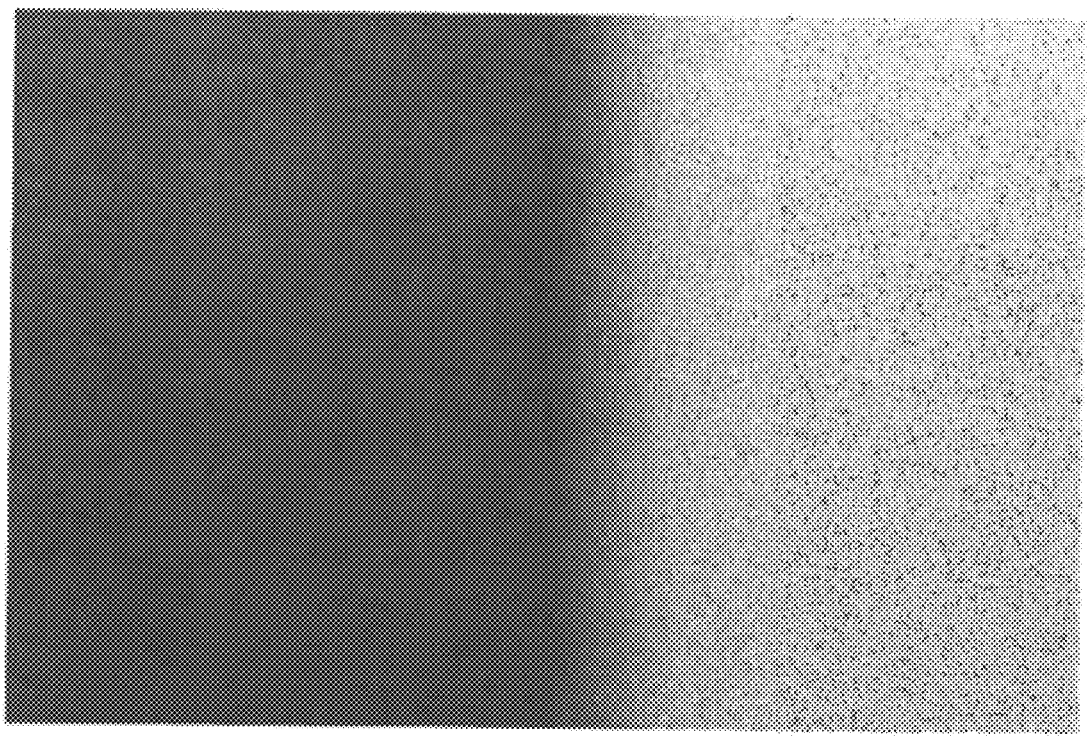

(52) U.S. Cl.
CPC ...... *H04N 5/23212* (2013.01); *H04N 5/23232* (2013.01); *H04N 5/23238* (2013.01); *H04N 5/23277* (2013.01); *G01B 2210/52* (2013.01); *H04N 5/2354* (2013.01); *H04N 5/2356* (2013.01)

(58) Field of Classification Search
CPC .............. 5/23212;H04N 5/23238; H04N 5/2356; H04N 5/2354; G01B 11/03; G01B 2210/52
See application file for complete search history.

(56) References Cited

U.S. PATENT DOCUMENTS

| | | | |
|---|---|---|---|
| 6,720,997 | B1 | 4/2004 | Horie et al. |
| 6,813,391 | B1 | 11/2004 | Uyttendaele et al. |
| 2004/0156054 | A1 | 8/2004 | Christoph |
| 2004/0252884 | A1 | 12/2004 | Foote et al. |
| 2008/0146931 | A1 | 6/2008 | Zhang et al. |
| 2009/0009614 | A1 | 1/2009 | Kawai |
| 2009/0160930 | A1 | 6/2009 | Ruppert |
| 2010/0085422 | A1 | 4/2010 | Yamashita et al. |
| 2010/0265357 | A1 | 10/2010 | Liu et al. |
| 2011/0102542 | A1 | 5/2011 | Chen et al. |
| 2012/0162360 | A1* | 6/2012 | Ohtomo ............ G01C 11/06 348/36 |
| 2013/0208997 | A1 | 8/2013 | Liu |
| 2015/0075018 | A1* | 3/2015 | Bridges ............ G01B 5/008 33/503 |

FOREIGN PATENT DOCUMENTS

| | | |
|---|---|---|
| DE | 102009043823 A1 | 7/2010 |
| DE | 10 2010 037 747 A1 | 3/2011 |
| EP | 1286134 B1 | 5/2006 |
| JP | 7-131779 A | 5/1995 |
| JP | 2000-069352 A | 3/2000 |
| JP | 2007-318648 A | 12/2007 |
| WO | 03/009070 A2 | 1/2003 |

OTHER PUBLICATIONS

Richard Szeliski: "Image Alignment and Stitching: A Tutorial", Dec. 10, 2006, XP002680820.
Office Action dated Jul. 5, 2016 for Japanese Application No. 2014-510805.
Office Action dated Jul. 21, 2016 for Chinese Application No. 201280035625.0.
Patent Abstracts of Japan English abstract and translation of JP 2000-069352 A.
Patent Abstracts of Japan English abstract and translation of JP 2007-318648 A.
Christoph, R, et al., "Multisensor-Koordinatenmesstechnik, Die Bibliothek der Technik, verlag modern industrie", 3. Auflage, 2003, pp. 1-94, (German version).
Christoph, R, et al., "Multisensor Coordinate Metrology—Measurement of Form, Size, and Location in Production and Quality Control", 2004, pp. 1-94 (English translation).

* cited by examiner

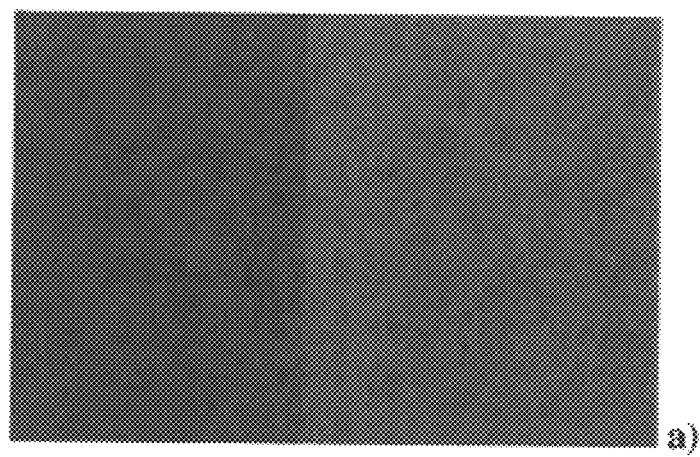
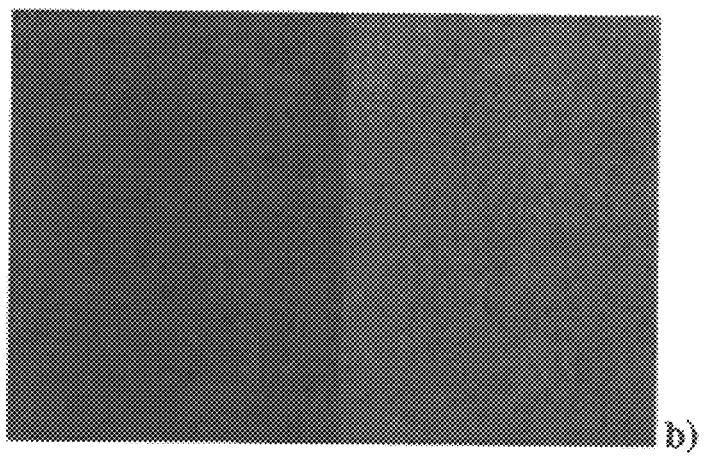
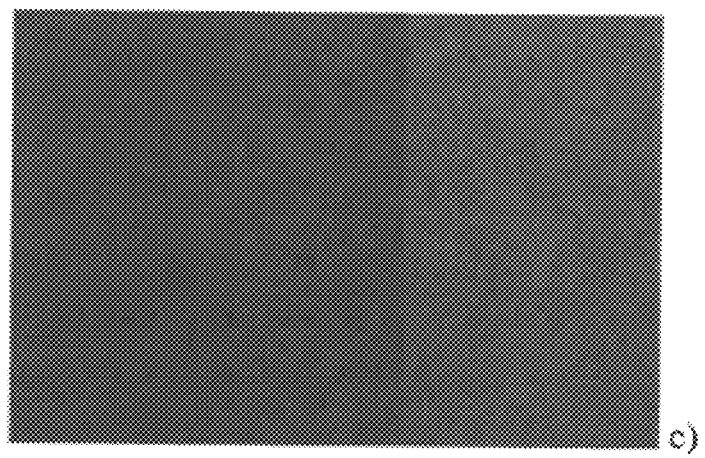
Fig. 2

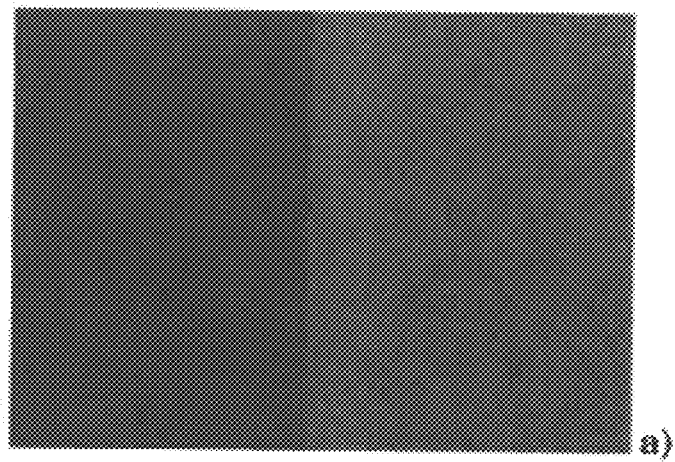
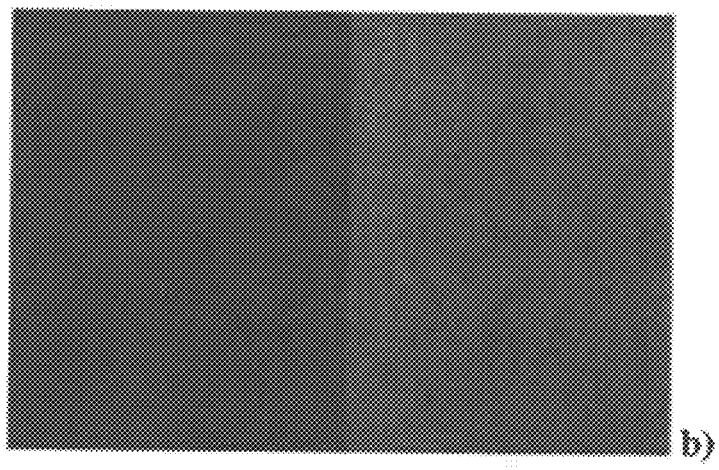
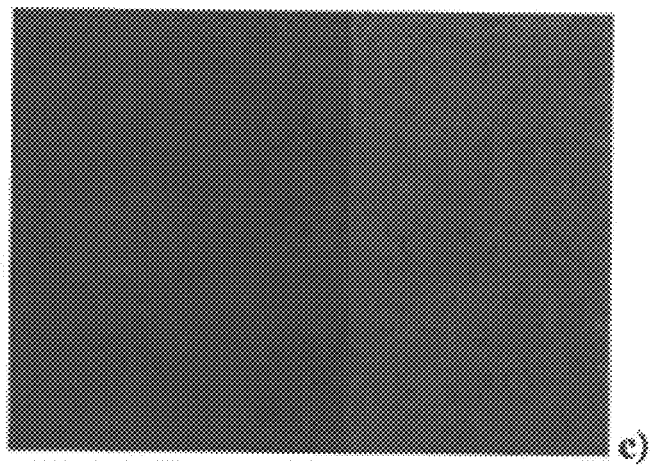
Fig. 3 a) b) c)

METHOD FOR GENERATING AND EVALUATING AN IMAGE

This application is a 371 of PCT/EP2012/053157, filed on May 16, 2012, which claims priority to German Application No. 10 2011 050 408.7, filed May 17, 2011, German Application No. 10 2011 051 894.0, filed Jul. 18, 2011 and German Application No. 10 2011 056 788.7, filed Dec. 21, 2011.

The invention relates to a method for generating an image of at least one section of an object using an optical sensor such as a camera.

In order to provide low-noise, high-contrast images, for example, for image processing or for auto focus measurements in the coordinate measurement technology, but also in other technical fields, it is necessary to set appropriate integration times on the camera. In the coordinate measurement technology, contours or contour points, for example, are determined in the generated recordings. To make it possible for this to occur with the utmost precision, it is preferable to have reproductions that are as sharp as possible. However, this assumes that the object and the camera are not shifted with respect to one another during the integration time of the camera. Otherwise, blurring effects occur, which affect the precision during the determination of the position of the contours.

To avoid this problem, methods are known in the prior art, in which particularly short integration times are selected for the cameras. However, the problem here is that the images are very dark and thus noisy. In order to attempt to prevent these disadvantages, light sources can be actuated briefly, in addition to continuous loading, in the flash mode.

This makes it possible to achieve greater brightness. However, in the case of particularly fast movements and dark scenes, this is frequently insufficient, and the images are either excessively dark and thus noisy, or the integration must be carried out for so long that the image blurriness leads to measurement deviations.

The purpose of the present invention is to further develop a method of the type mentioned in the introduction, so that the disadvantages of the prior art are avoided, and in particular so that a bright image is produced, which does not have blurring or does not have blurring to an extent where measurement falsifications occur, in particular even if there is a relative movement between the camera and the object or the section to be recorded.

To fulfill the purpose, it is proposed, among other proposals, that several individual images are recorded of the at least one section, and that, for the generation of the image, the individual images or signals thereof are aligned with respect to one another in reference to the at least one section and superposed to form an overall image.

In particular, the invention provides a solution, characterized in that individual images are recorded from the one section or individual images are recorded from several sections in such a way that individual images overlap at least partially, and in that, for the generation of the image, the individual images or signals thereof are aligned with respect to one another and superposed to form an overall image as the image of the section or sections, wherein for the evaluation of the overall image overlapping regions of the individual images are taken into consideration.

The invention proposes a method for generating and evaluating an image of at least one section of an object using an optical sensor such as a camera, which is characterized in that individual images are recorded of the at least one section, of which at least some individual images in each case overlap at least partially, and in that, for the generation of the image, the individual images or signals thereof are aligned with respect to one another and superposed to form an overall image as the image of the at least one section, wherein the evaluation of the overall image is limited substantially to the overlapping regions of the individual images and/or the evaluation of the overall image or of a portion thereof occurs on the basis of the overlapping regions of the individual images comprising said regions.

On the basis of the teaching according to the invention, a change in the position between the optical sensor—hereafter also referred to as the camera in a manner which does not restrict the scope of the protection—and the at least one section of the object, during the recordings of the individual images is taken into consideration, so that a bright image having no blurring due to movement is available.

The invention thus relates to a method for image generation using a camera, wherein an overall image is generated from several individual images, in principle by superposition and by taking into consideration position offset between the individual recordings.

In particular, the intensities of several individual recordings are superposed, in order to generate a brighter overall image. Since, for physical reasons, there is always a slight position shift between the camera and the recorded measurement object region between two individual recordings, said shift in position must be corrected.

According to the invention, this can occur by measuring the position for each individual recording, or by examining, using the recorded images, the correlation and calculating the position deviation therefrom.

In the next step, the individual views are shifted, in accordance with their position deviation with respect to one another, to a common position and preferably into a common pixel grid. Subsequently, the superposition of the gray value amplitudes to form a superposed image occurs. The measurement position of the selected pixel grids is assigned to this image, at least in the lateral directions. In the remaining third spatial direction, perpendicularly to the image plane, it is preferable to assign an average determination to the position of the superposed individual views.

This means that a mean value is calculated from the distance values relative to the image plane. If the image plane is in the x-y plane, accordingly, the Z value assigned to the image or overall image is calculated by averaging the individual Z values of the individual images.

According to the invention, a composite image is generated from the individual images, which has the required brightness, without the occurrence of blurring due to movement, so that the at least one section of the object can be evaluated and thus measured.

The individual images—also referred to as partial images—with respect to the same section of the object present in said individual images, are aligned with respect to one another in such a manner that a composite image is generated, which is the overall image and thus the image to be generated.

The feature that individual images are recorded of the at least one section of an object to be measured naturally does not exclude that the entire object is determined.

The invention relates to a method for image generation using an optical sensor such as a camera, wherein several individual views are superposed, which substantially contain the same section of an object, that is mostly superposed object sections, wherein the spatial position of the individual views with respect to one another is taken into consideration.

In particular, the invention is characterized in that the spatial position of the individual views with respect to one another is determined with the aid of the correlation of the gray values of the individual views and/or with the aid of the sensor or camera position determined for each individual view. The sensor or camera position results, for example, from the positions of the axes of the coordinate measurement apparatus, in which the sensor or the camera is integrated.

A correlation of the gray values is carried out in such a manner that the largest cumulative value is obtained. This represents the greatest correspondence of the individual images with respect to the at least one section, which can be achieved by an apparently sideways, that is lateral shifting of the individual images to be superposed.

The invention is characterized in that the superposition occurs by the addition of the intensities or gray values of the pixels of the individual views.

Here, it is possible to provide that, before the superposition, the spatial position offset between the individual views is corrected by shifting and/or rotating, at least in the image plane of the individual views.

The invention is also characterized in that the image generated from the individual views contains only the overlapping image sections that are present in all the individual views.

The invention also provides as an inventive feature that, for the evaluation of the overall image, at least one overlap-free region of one or more individual images is taken into consideration, and that, for the evaluation of the overlap-free region, its gray value is normalized to the gray value of the overlapping region to be evaluated of individual images.

Thus, according to the invention, first all the individual images recorded are taken into consideration in the determination and evaluation of the overall image, regardless of whether they overlap or record the same or at least largely the same region or section of the component. It is preferable that, during the superposition of the images for sections of which several individual images are available, the superposition is carried out using the individual recordings. For sections of which only one individual recording is available, an appropriate weighting of the gray values is carried out, in order to achieve the same overall brightness as with the superposed images.

Very generally, the invention is also characterized in that the gray values of regions to be evaluated are normalized, in particular they are normalized to a gray value which corresponds to that of a region with maximum overlap.

However, the scope of the invention is not exceeded if individual regions are excluded from the evaluation.

From the totality of all the individual images to be taken into consideration definitively, an overall image is assembled. Using this overall image, evaluations can be carried out using image processing algorithms, such as, for example, the determination of edges or distances from the edges, or geometric features.

It is preferable to provide that the overlap region of the sections is less than 100%, in particular between 100% and 10%, and preferably between 100% and 50%.

According to the invention, it is provided that the overlap region of the recorded individual images is preferably less than 100% of the respective individual image.

In a preferred embodiment, the overlap is approximately 50%, as a result of which, for each region, a superposition of at least two individual images can occur. Alternatively, the overlap can also be greater, for example, between 60% and 90%. As a result, for each region, more than two images are superposed, making it possible to achieve an even greater brightness and thus less noise. In this manner, even shorter integration times of the camera become possible. At the time of the superposition or averaging, the number of superposed images is then taken into consideration by means of an appropriate scaling. If the overlap region is less than 50%, regions in which superposed images are available are formed as are regions for which this is not the case. In regions for which no superposed images are available, the brightness is adapted to the brightness of the superposed images by scaling or by weighting of the gray values.

The invention is also characterized in that the size of the overall image is greater than the size of an individual image.

Moreover, it should be emphasized in particular that the individual images can be recorded in different positions of rotation of the object. Thus, according to an independent solution proposal, the individual images are recorded in different positions of rotation of a measurement object. As a result, it is possible to record different partial regions of the measurement object, which are located, for example, on the outside surface of a rotation symmetrical component. A combination with a lateral movement of the measurement object to produce an overall image that is enlarged in several dimensions in comparison to the individual images is also possible.

The invention is characterized furthermore in that, as desired, the entire region or a partial region or several partial regions of the detection surface of the camera can be used, preferably a limited number of rows.

The image repetition rate is increased considerably in comparison to the prior art in that only portions of the available rows and/or columns of a matrix-shaped detection surface, such as a camera, are used for the evaluation.

Here, it is possible to achieve image repetition rates of approximately 300-400 Hz, for example. In particular on curved surfaces, as a result of the reduction of the rows or columns, only those regions are evaluated which are arranged in the depth-of-field range of the reproduction optics used.

The selection of the corresponding regions can occur either manually, as a result of a firmly predefined indication of a measurement window, for example, in a preliminary run or in the context of the establishment of a measurement program, or the selection can occur automatically during the course of the measurement program by evaluating the contrast of the recorded images and by selecting the rows that exceed a predefined limit value of the contrast.

In particular, it is provided that the partial regions in each case are established or determined by a limited number of rows and/or columns of the matrix-shaped detection surface.

The teaching according to the invention makes it possible to use an increased measurement frequency during the recording and/or processing of the measurement values of merely partial regions of the photosensitive detection surface.

For the definition of the partial regions to be evaluated, prior to the measurement itself, it is particularly suitable to use the definition of firmly predetermined windows. Said windows can be established in the context of the measurement program preparation, for example. Here, the operator can define the region of the measurement window, which contains the partial regions to be measured or the regions with sharp reproductions, either manually or with the aid of evaluation tools. A change in the partial regions to be evaluated during the measurement course, particularly in real time, can occur by determining the contrast over the entire image. The determination of the contrast values of the individual pixels of the image can here occur either directly in the sensor—which, as mentioned, is also referred to as the camera, in a simplified manner and without restricting the scope of the teaching of the invention—, that is without the transmission of the image to a host computer, or directly in the image processing software of the host computer. In particular, during the evaluation of the contrast in the host computer, not all the images, but only individually selected images are transmitted and evaluated completely by the camera, in order to allow as high as possible a measurement frequency. Here it is assumed that the contrast values within the image change clearly more slowly than the repetition frequency of the camera.

Preferably, it is provided that, by switching the partial regions to be evaluated, an adaptation to the region of the measurement object which is within the depth-of-field range of the reproduction optics used occurs.

The invention provides in particular for the determination of the spatial position of the individual recordings relative to one another with the aid of the position of rotation of the component, and preferably for the rectification of the individual images due to the curvature of the object. When recording individual recordings in different positions of rotation of the component, the individual images are distorted due to the curvature of the measurement object. In a separate inventive idea, this curvature of the individual images is rectified. With the aid of the known or approximately known, for example, previously entered, curvature radius of the component surface, the regions in the image are rectified in accordance with the curvature present, by shifting the lateral position of the recorded pixel data. This development of a rotation symmetrical outside surface which is also known in the prior art, after the rectification, first leads to a nonequidistant pixel grid. This is converted by resampling to an equidistant pixel grid, for further processing.

Moreover, it is a characteristic of the invention that the superposition occurs by averaging the intensities or gray values of the pixels of the individual recording, which in terms of position correspond to one another, and that the resulting gray values are preferably spread, preferably by division, preferably using a factor which corresponds at most for one pixel to the number of gray values in the overall image that is utilized for the superposition.

As a result of these measures, an adaptation of the gray value range to be evaluated to a common maximum gray value occurs.

The invention is also characterized particularly in that the regions in the overall image which have a gray value below a threshold value after the superposition remain not taken into consideration, wherein the threshold value is preferably 20%, particularly preferably 10% of the maximum gray value.

Regions in the overall image whose gray value is below a threshold value even after the superposition or as a result of the fact that no superposition took place, the threshold value being, for example, 20% or particularly preferably 10% of the maximum gray value, are not taken into consideration in the determination of the overall image. As a result, regions that have a signal/noise ratio that is too low are excluded from the evaluation.

Moreover, it should be emphasized in particular that, during the superposition, a weighting of the regions in which at least one of the individual images used for the superposition is located in the marginal region occurs.

During the superposition, a weighting of the regions in which at least one of the individual images used for the superposition is located in the marginal region occurs. This is always the case when the superposition is less than 50%. In the process, in the assembled superposed images, regions are produced with which a superposition can occur, namely the marginal regions of the individual images. In the central regions of the individual views, on the other hand, there is no superposition. In accordance with the number of images used for the superposition, an appropriate weighting therefore must occur to ensure the same overall brightness in the superposed image.

In particular, the invention is characterized in that, after the correction of the position offset between the individual views, the pixels of all the individual views used are converted to a common, preferably equidistant point grid by resampling, wherein, the gray value is calculated for each target pixel from the gray values of the surrounding pixels, preferably by linear interpolation methods or averaging methods.

According to the invention, it is provided, furthermore, that a higher lateral resolution can be achieved by resampling than is possible in the process known to date for determining individual points on the basis of an individual image. Due to the individual image superposition or overlapping, that is due to the use of repeatedly recorded data of the same object section, this redundant data can be used in order to increase the measurement resolution. In particular, it is provided that the data on at least one region of the image, which originate from at least two individual recordings, are used together for the determination of the position of a feature in this image region, preferably by using resampling methods in order to increase the lateral resolution. In the process, a resulting pixel is determined for all the pixel positions from all the individual or partial regions.

Moreover, it should be emphasized that, in each case, several individual recordings can be recorded immediately one after the other, preferably with shorter integration time than a standard integration time—for example, 20 milliseconds—, particularly preferably with integration times <5 milliseconds or <1 millisecond or <0.5 millisecond. The integration time T for the respective individual recording should be 4 T≤t, in particular, or 20 T≤t, particularly preferably 40 T≤t, where t=standard integration time. In particular, the following should be true: $\frac{1}{50} t \leq T \leq \frac{1}{2} t$.

According to the invention, the individual images are recorded with shorter integration times in comparison to the integration time within which an image is usually recorded. The standard integration times can be 20 milliseconds, for the purpose of ensuring a contrast that can be evaluated. However, values pertaining to this should be understood to be merely examples. In particular, it is provided that the total integration time of the individual images is smaller than a conventional standard integration time.

In particular, the invention relates to a method for generating an image with an optical sensor, such as a camera, wherein an integration time T-total is assigned to the image, wherein several individual recordings recorded with integration times $T_1$ to $T_n$ are superposed, wherein all $T_1$ to $T_n$ with shorter integration time, such as <5 ms or <1 ms or <0.5 ms, are recorded as T-total, wherein the spatial position of the individual recordings with respect to one another is determined and taken into consideration during the superposition.

The method according to the invention is used in particular for determining object points and/or contours and/or dimensions of measurement objects, preferably in a coordinate measurement apparatus, wherein the coordinate measurement apparatus provides means for the relative movement between the measurement object and the camera.

It is preferable to provide that the method for image generation during the auto focus measurements is used preferably with an increased movement speed V where V>0.3 mm/s or V>1 mm/s or V>3 mm/s, as a standard movement speed of approximately 0.3 mm/s to 0.1 mm/s, or for the image generation for image processing measurements during a camera movement. During the auto focus measurement, the distance between the optical sensor such as a camera and the measurement object is varied primarily.

An inventive solution idea is characterized in that, during the auto focus measurements in the direction of the optical axis of the optical sensor individual images are recorded, in that successive individual images are superposed and subdivided into groups, wherein each group forms an image for the auto focus measurement, and in that all the individual images are aligned with respect to one another taking into consideration an optionally present sideways offset with respect to the object.

The teaching that is the basis of the invention can be used particularly in a method for image generation for auto focus measurements. Here, at least two individual or partial images of the same section of the measurement object, images which are adjacent in the direction of the optical axis of the optical sensor, are superposed, wherein the total number of the individual images is subdivided into groups. Each group thus forms an image or overall image for the auto focus measurement. In order to superpose the images, any sideways, that is lateral offset of the recorded section of the measurement object is taken into consideration. As a result of the teaching on this subject, short integration times become possible in the auto focus measurements. Finally, one achieves, among other advantages, the advantage that blurriness is prevented and deviations of the lateral, that is sideways position, between the optical sensor and the measurement object, during the integration time of the camera, are minimized.

In an independent embodiment of the invention, the basic idea to reduce motion-caused blurriness by selecting short exposure times for the optical sensor such as a camera is applied to auto focus measurements. In the process, regardless of the selected illumination conditions or surface constitutions of the measurement object, at first only very briefly exposed, and consequently very dark, images are recorded during the relative movement of the optical sensor in the reproduction direction.

The purpose of the superposition is to increase the brightness, that is the gray values in the partial images, to a reasonable value corresponding, for example, in the case of a standard exposure time, to 20 ms, for example. Here, it is advantageous that, in contrast to an image that has been exposed using the standard exposure time, images produced with shorter exposure times are influenced clearly less by the movement in the movement direction or in the direction transverse to said movement direction. To each partial image recorded in the movement direction, a position is assigned in all three spatial directions, that is two lateral directions and one direction that is roughly in the direction of the movement. The totality of the partial images then forms the so-called image stack.

According to the invention, before the superpositions, all the partial images are converted to a common matrix transversely to the movement direction, preferably by resampling. As a result, mutually corresponding regions form in the partial images.

Subsequently, for each partial image of the image stack produced, and for each partial image, such as individual pixels or cohesive groups of pixels, a superposition of the gray values of the respective mutually corresponding regions is carried out separately.

As a result, a new image stack with an identical number of partial images is formed, wherein the pixels of the latter now have higher gray values. This superposition can also be referred to as moving, analogously to a moving average filter, the use of which also results in the number of the input values remaining identical.

For each partial region of each partial image, the number of corresponding partial regions —which are used for the superposition— of the partial images adjacent in the movement direction is now selected separately in such a manner that a threshold value for the gray value is exceeded. As a result, it is ensured that all the partial regions in all the partial images are sufficiently high for a reasonable evaluation of a focus criterion, for example, by forming contrast values and by evaluating the position of the highest contrast in the movement direction. The threshold value is preferably, but not necessarily, of equal magnitude for all the partial regions in all the partial images, for example, 30% or 50% or 70% of the maximum possible gray value. For the formation of contrast values, however, a normalization to a predetermined number of superpositions must occur, so that the gray values of the partial regions correspond virtually to the same exposure time.

In order to prevent the occurrence of an excessively strong averaging of the image contrasts that change according to the method along the movement direction, the number of partial images used for the superposition, or the path in the movement direction from which they originate is restricted. The path restriction can be defined, for example, in relation to the depth of field of the reproduction optics used, for example, 100%, preferably 50%, particularly preferably 20% or 10% of the depth of field.

In a particular embodiment, equal numbers of adjacent partial images are selected in the positive and negative movement direction for the superposition. As a result of the symmetry produced in the process, the position of the original partial region in the movement direction is assigned to the position of the resulting partial region in the movement direction. Alternatively the mean value or the median is assigned to the positions of the respective partial regions used for the superposition in the movement direction.

The principle of auto focus measurement and its use can be obtained, for example, from DE.Z.: Multi-sensor-Koordinatenmesstechnik, Die Bibliothek der Technik, verlag moderne industrie, 3rd edition 2006, (ISBN-10: 3-937 889-51-5, ISBN-13: 978-3-937 889-51-1), pages 26-27 (auto focus) and page 32 (3D patch).

The invention is characterized in that during the recording of the individual recordings to be superposed, a preferably flash-like illumination is switched on, wherein individual image recording, illumination and recording of the position of the axes of the coordination measurement apparatus are synchronized in such a manner that an exact position for each individual recording is present and guaranteed, and in that during the integration time of each individual recording the illumination is switched on.

The highest measuring speeds can be reached by combining the method according to the invention with the method of image processing scanning of so-called "on-the-fly" technologies, in which the image recording occurs during the movement of the measurement object. For the reduction of the motion-caused blurriness, the photosensitive detection means of the optical sensor or of the camera is here exposed for only a short time, for example, by using a flash-like illumination or shutters. The temporally limited exposure occurs here synchronously with the recording of the current work piece position or of the photosensitive detection means using position detection means and the measurement value recording of the photosensitive detection means. These methods are described in EP-B-1 286 134 and WO-A-03/009070, among other documents, the disclosures of which are the subject matter of the present invention.

It is preferable for the camera to be a multi-pixel camera and it is preferably a CCD or CMOS camera.

Regardless of this, one can use as measurement objects any objects having a rotation symmetrical and/or cylindrical shape, in particular stents.

For the measurement of rotation symmetrical and/or cylindrical measurement objects, rotation and/or swivel axles are used in particular.

During the object measurement by image processing and with manual positioning systems, the position to be measured must first be approached by manually actuating the movement axles. After reaching this position, the image recording is triggered and the geometric features are evaluated. DE-A-10 2009 044 099 describes an enlargement of the method, in which the positioning at the site to be measured does not have to be interrupted; instead, the measurement value recording takes place during the movement. This has the advantage that the position to be measured needs to be approached only approximately.

In methods according to the prior art, the position to be measured must be established beforehand, that is it has to be known. This position then has to be approached manually in a start-stop procedure or during the continuous operation by the user. The user for this purpose must orient himself/herself relative to the component, which can sometimes be very time consuming.

Thus, the aim of the invention is to solve the problem of carrying out the determination of the geometry of measurement object in a user friendly and rapid manner. In particular, in the process, as large as possible a portion of measurement object or the entire measurement object should be determined, without the user having to move toward previously determined individual positions.

This aspect of the invention is solved in particular in that, during any positioning of the measurement object carried out by an operator relative to the optical sensor—also referred to as the image processing sensor—images are recorded and optionally evaluated. The image recording occurs either during the movement or when the manual positioning process is stopped. The optical sensor such as a camera, in particular a CCD or CMOS camera, that is used acquires images on a regular basis in the process or only in the case of a change in the image content triggered, for example, by a change in the measurement position, illumination, integration time of the camera, duration or time of a flash-like illumination or when a position region is reached which has not been reached previously. At least some of the partial images which correspond to the above explained individual images, and which are assessed or evaluated according to the teaching of the method, overlap at least in one region.

A selected number of individual images is made available, after the completion of the positioning, for further evaluation. In particular, several individual images—also referred to as partial images—are assembled to form an overall image, preferably by resampling methods with the aid of interpolation or averaging algorithms. These partial images are represented preferably on a monitor. This occurs in parallel to the positioning, as a result of which the user can monitor the region of the measurement object that has already been covered. Optionally, the region that has already been determined is scaled in each case to the size of the display unit. In particular, partial images are then represented and made available for further processing, when a position has been reached for which complete measurement data are not yet available, that is a portion of the object region currently recorded by the image processing sensor has not yet been arranged in the measurement region of the image processing sensor. This can be monitored, for example, by comparing the positions and images of already selected images with the currently recorded ones. On the basis of the position and of the measurement region of the image processing sensor formed by the camera measurement region and the selected representation lens, the respective acquired portion of the measurement object is determined in the process.

The described method can be used for predominantly flat work piece regions but also for predominantly rotation symmetrical work piece regions.

In the case of flat work pieces which are arranged firmly on a measurement table, it is more advantageous first to position the measurement object in the sharp region of the image processing sensor, by means of a vertical adjustment. Subsequently, using the lateral axle drive, the manual positioning in the plane of the work piece is carried out and in the process positions and images are recorded.

When using rotation symmetrical or largely rotation symmetrical work pieces, which are arranged on a mechanical rotary axle, the setting of the sharpness takes place first using the movement axle which extends perpendicularly to the rotary axle and in the direction of the optical axis of the image processing sensor. Subsequently the image recording occurs during the combination of the lateral positioning of the measurement object relative to the image processing sensor and the rotary movement of the rotary axle. The representation of the recorded images on a display unit then occurs in the developed format.

After the assembly of the individual partial images, which correspond to the individual images prior to this, to form an overall image, the latter is available for further evaluation, for example, for the detection and determination of contours, edges or geometric features.

According to the invention, the image recording can also occur in the case of a relative movement between the image processing sensor and the measurement object. In the process, the image recording is carried out by the image processing sensor and the position recording, synchronized by the scale systems of the manual movement axles and the actuation of an optionally used flash-like illumination, and controlled by a trigger signal. A trigger signal is generated, for example, when a new measurement position has been assumed, in which a partial region of the measurement object which has not yet been measured is acquired by the image processing sensor, or if the image content must have changed because the illumination, the integration time of the camera or the duration or time of a flash-like illumination has changed. Alternatively, it is also possible to record images on a regular basis, by a predetermined measurement cycle.

It is preferable to use the method in a coordinate measurement apparatus.

The invention thus relates to a method for determining the geometry of a measurement object using an optical sensor or an image processing sensor, and a manual positioning device, and it is also characterized in that during one positioning process and/or between several positioning processes, individual images are recorded automatically with the image processing sensor, and subsequently selected individual images are assembled into an overall image and made available for further evaluation.

In particular, it is provided that an individual image is selected when a region of the measurement object not yet been acquired completely previously is acquired by the image processing sensor.

The invention is characterized in particular also in that the optical sensor such as a camera, for example, a CCD or CMOS camera, records an individual image on a regular basis and/or in the case of the change in the position of the positioning device and/or if a position region of the positioning device has been reached and/or in the case of a change of the illumination and/or in the case of a change of other parameters that influence the image recording and/or the image content, such as, for example, the integration time of the camera or the duration of the time of a flash-like illumination.

The possibility also exists for the selected individual images to overlap slightly.

Moreover, it should be emphasized that the individual images selected are assembled by means of resampling methods, for example, using interpolation or averaging methods, to form an overall image, and are made available for further evaluation, and displayed preferably on a display element, in the case of rotation symmetrical components in the developed form, preferably in each case scaled in adaptation to the size of the display unit.

The invention is also characterized in that the detection of whether a received individual image has been selected and made available for further evaluation occurs by monitoring the position and/or the change in the position, determined by scale systems, of the movement axles to be actuated manually and/or of the image content recorded by the image processing sensor.

In particular, it is provided that the monitoring comprises the determination, and in the case where the image has been selected, the storage of the positions and/or image contents of the respective recorded individual image, and the comparison with already available positions and/or image contents of already selected images.

Moreover, it should be emphasized that, on the basis of the comparison with already available positions and/or image contents of already selected individual images, an individual image is then selected if at least a portion of the individual image acquires a region of the measurement image which has not yet been acquired prior to this, wherein the measurement region of the image processing sensor formed by the camera measurement region and the selected reproduction lens is taken into consideration.

The invention is also characterized in that, after positioning the work piece surface in the sharp region of the image processing sensor, primarily flat work piece regions are positioned by means of the lateral axles, and predominantly rotation symmetrical work piece regions are positioned using additionally a mechanical rotary axle, into the measurement region of the image processing sensor.

In an inventive variant, a method is provided for determining the geometry of a measurement object using an image processing sensor and a manual positioning device, which is characterized in that the image recording occurs during a relative movement between the image processing sensor and the measurement object, wherein, in a synchronized manner, the individual image recording occurs by means of the image processing sensor, and the position recording occurs by means of the scale system of the manual movement axles, as well as preferably a flash-like illumination, controlled by a trigger signal.

In particular, it is provided that the method is used in a coordinate measurement apparatus.

Additional details, advantages and features of the invention result not only from the claims, the features to be obtained from the claims—individually and/or in combination—, but also from the following description of a preferred embodiment example which can be taken from the drawings.

Figure 4:
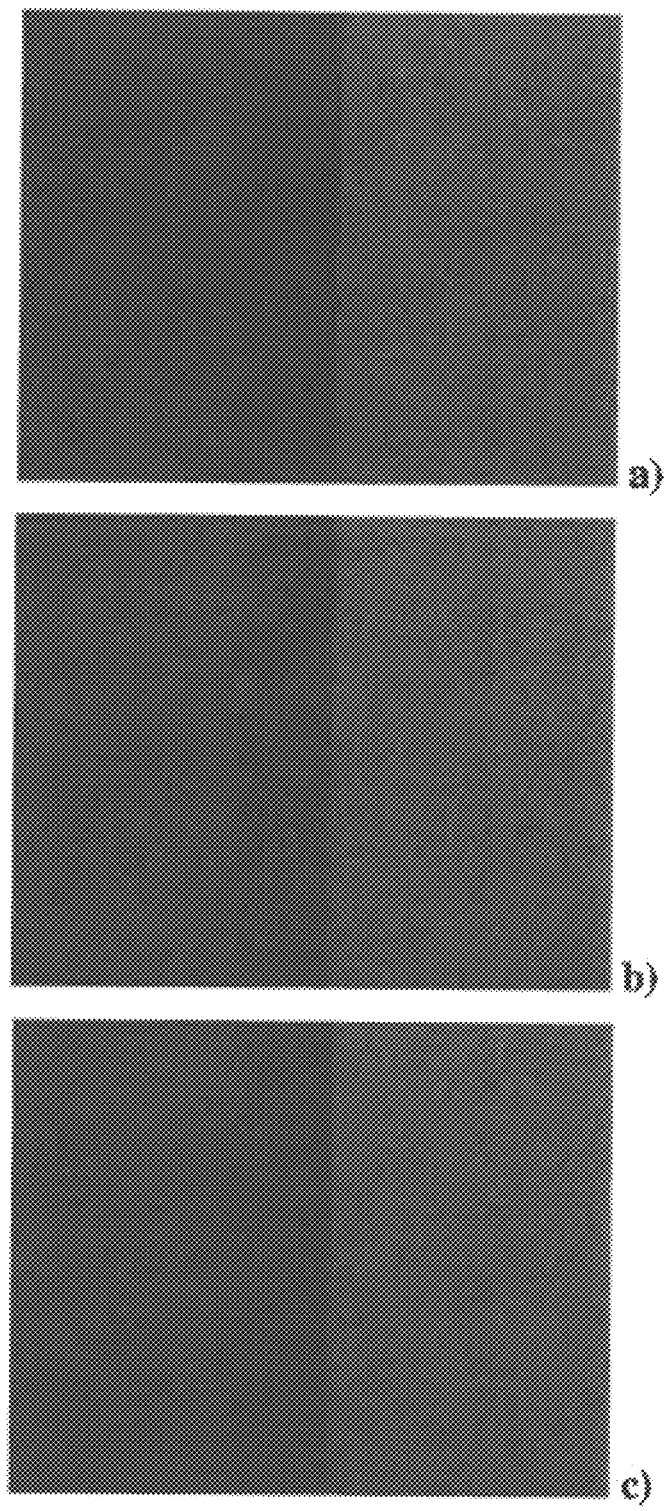
Figure 5:
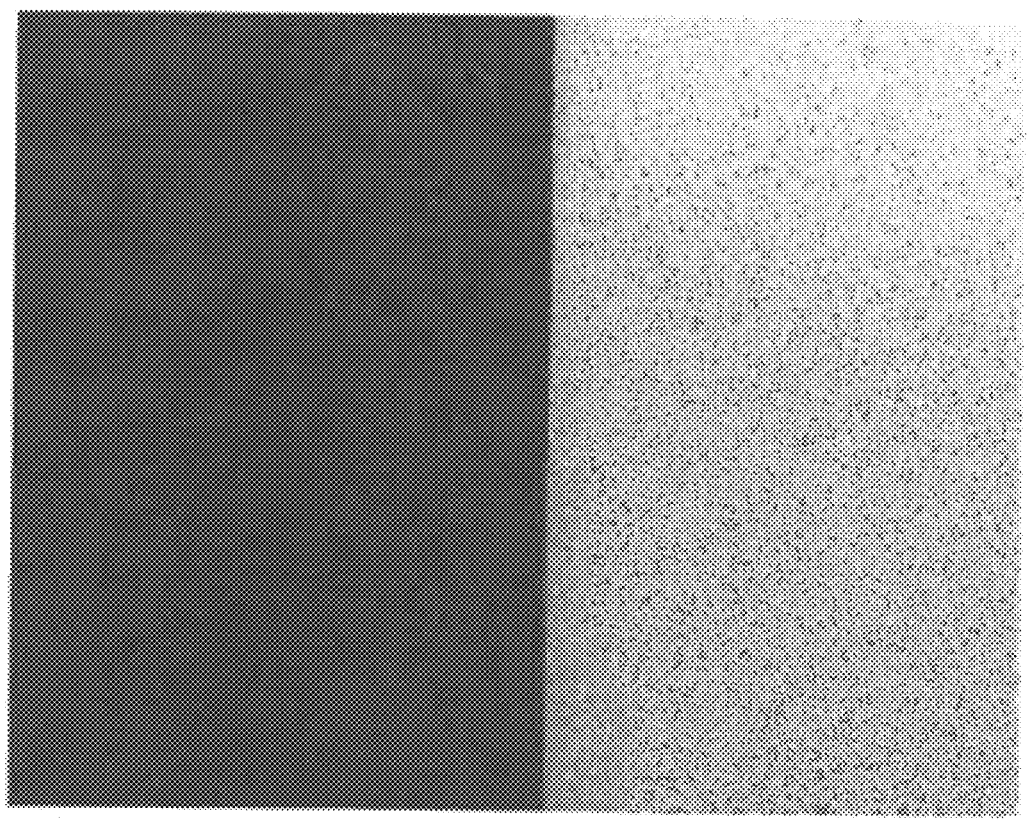
Figure 6:
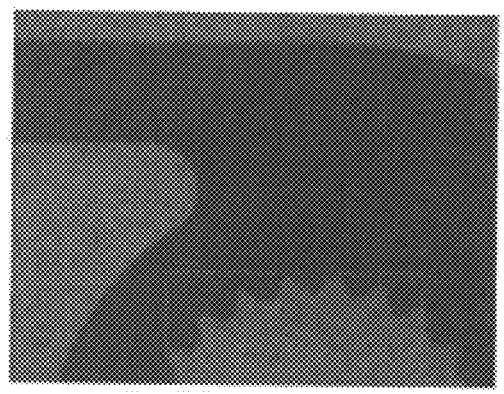
Figure 7:
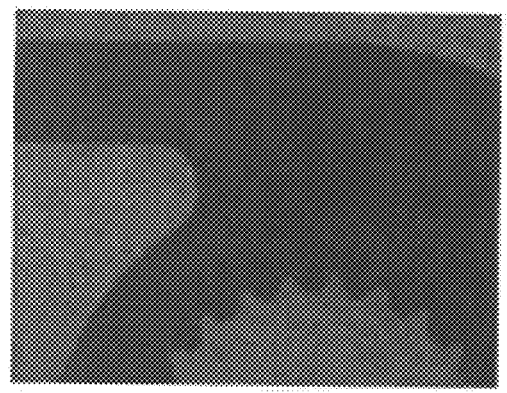
Figure 8:
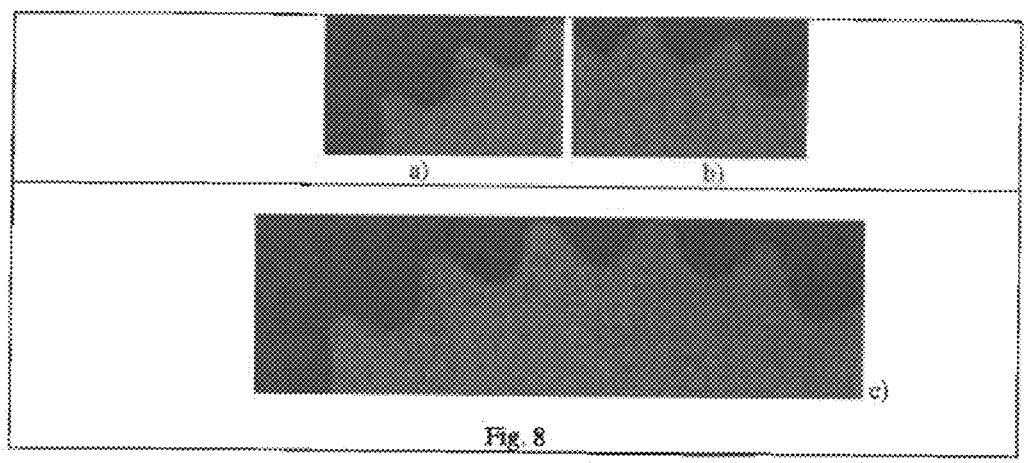
Figure 9:
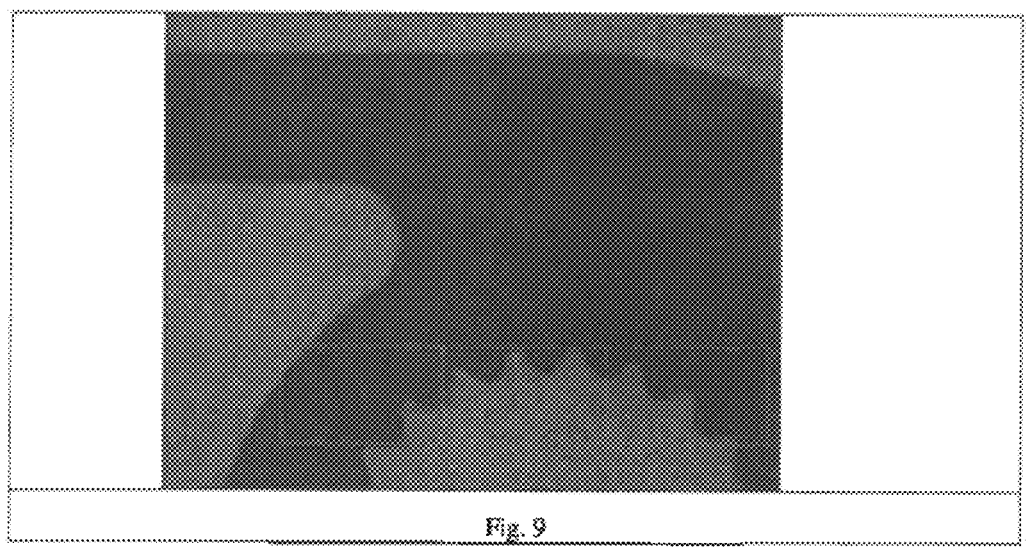
Figure 10:
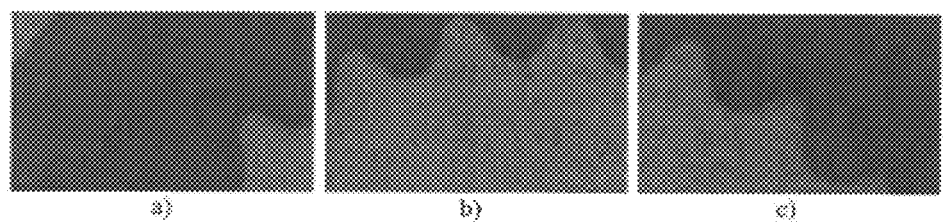
Figure 11:
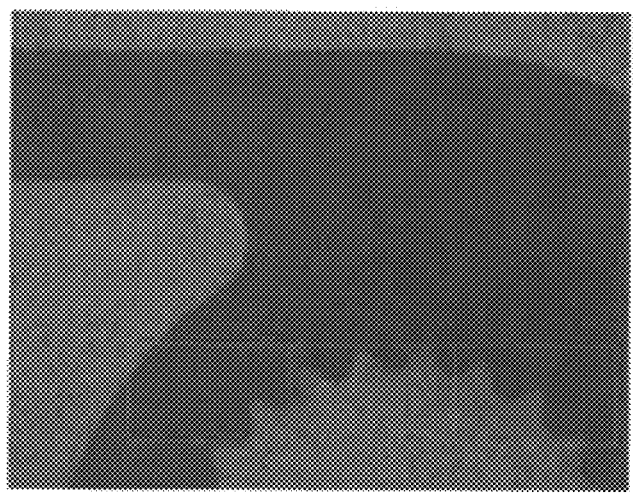
Figure 12:
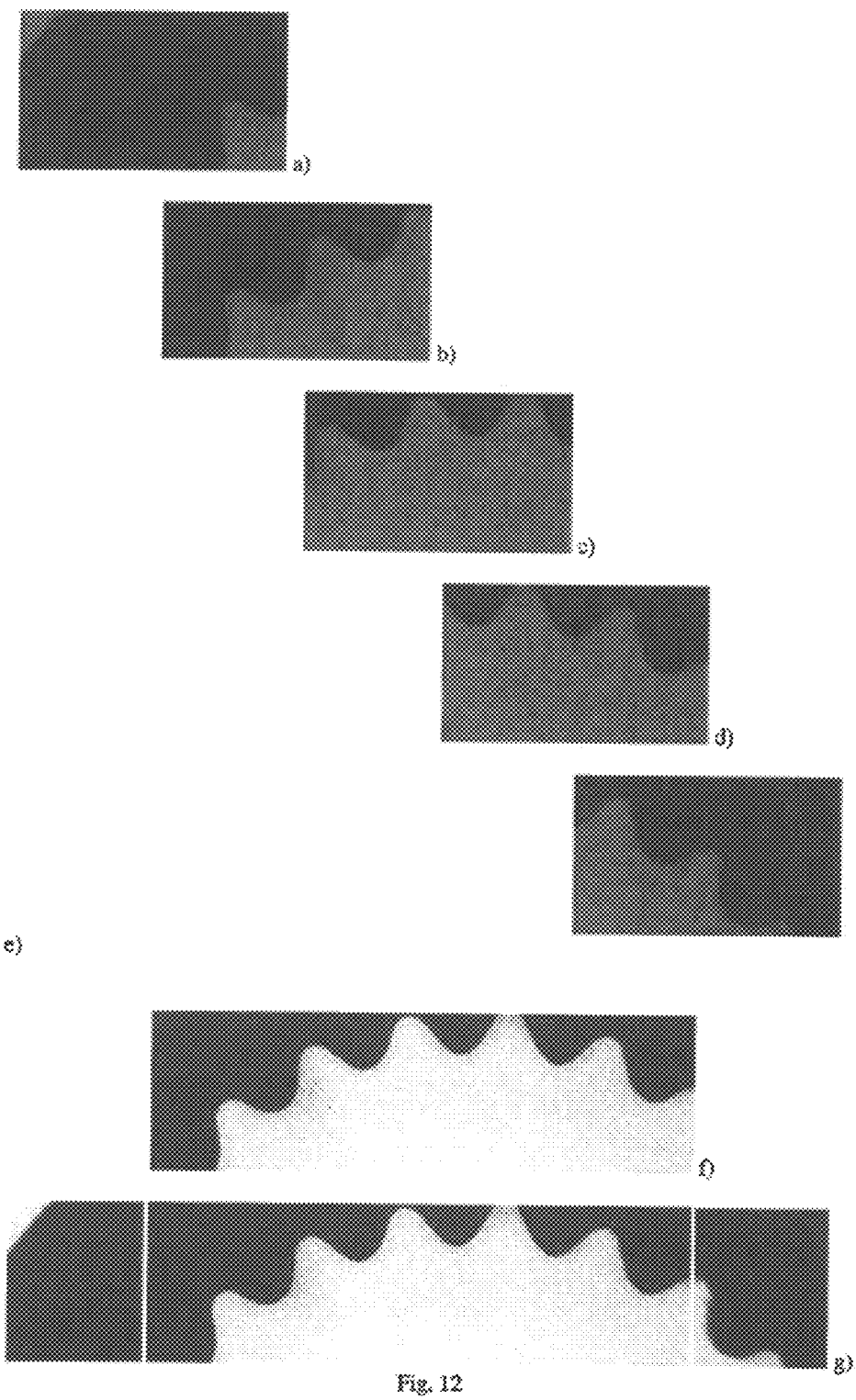
Figure 13:
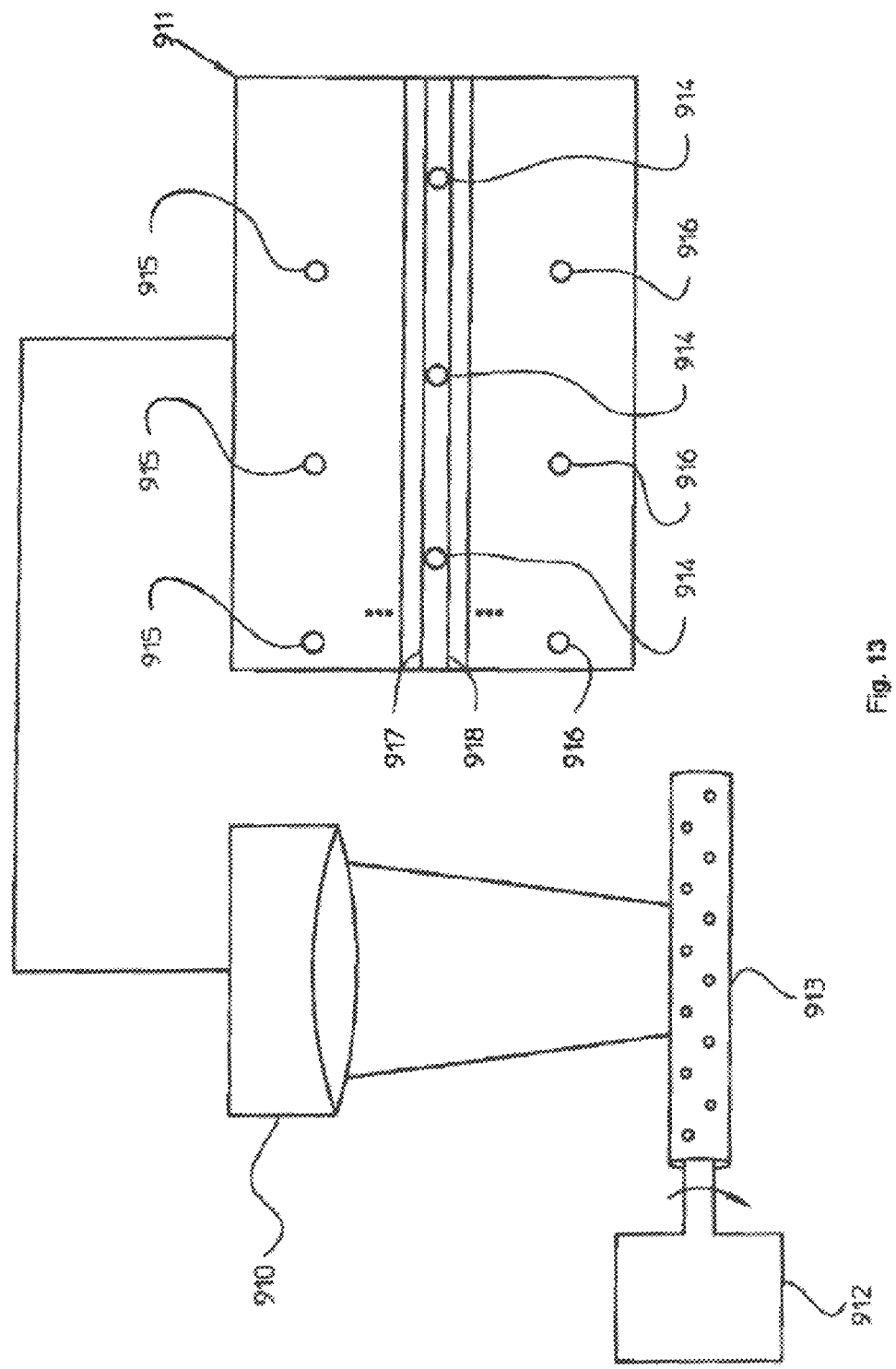
Figure 14:
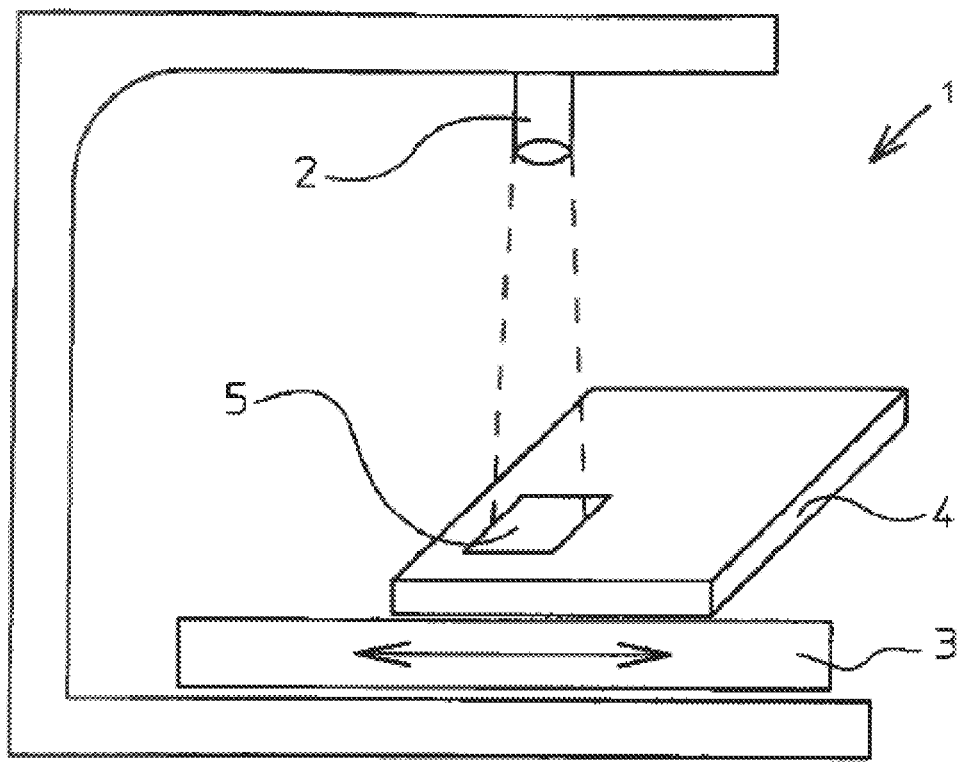
Figure 15:
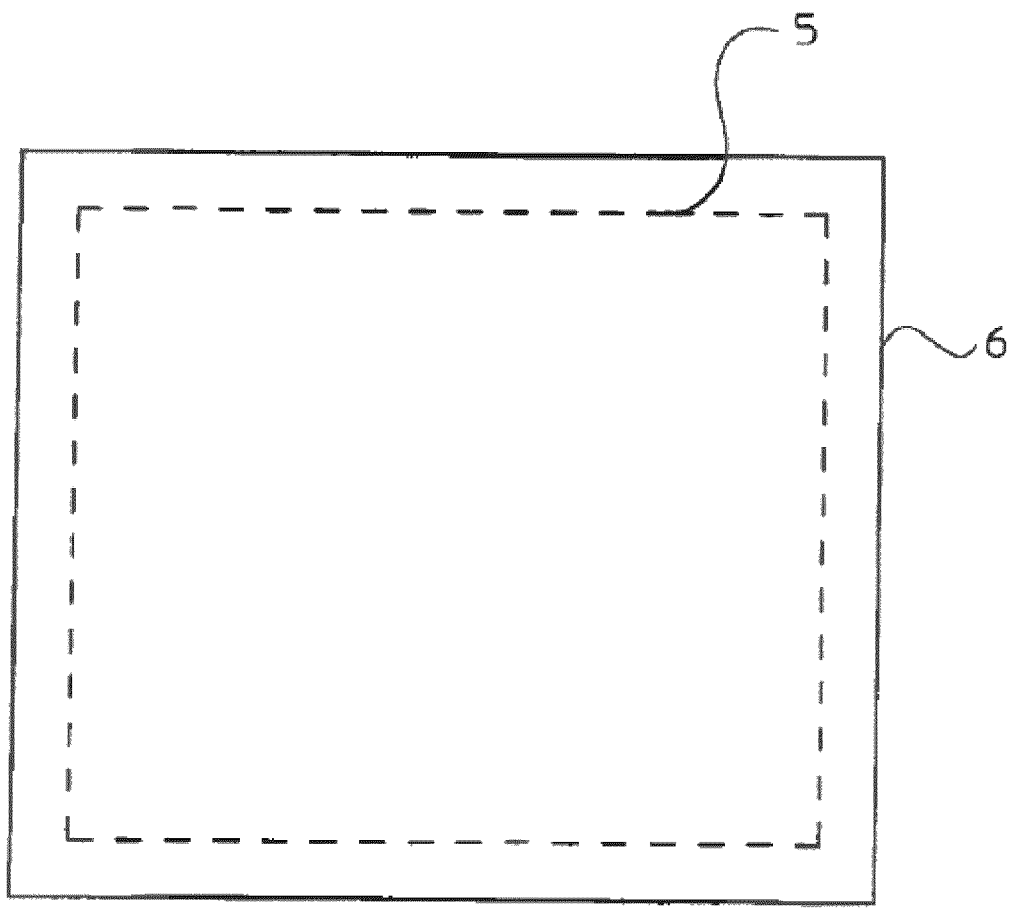
Figure 16:
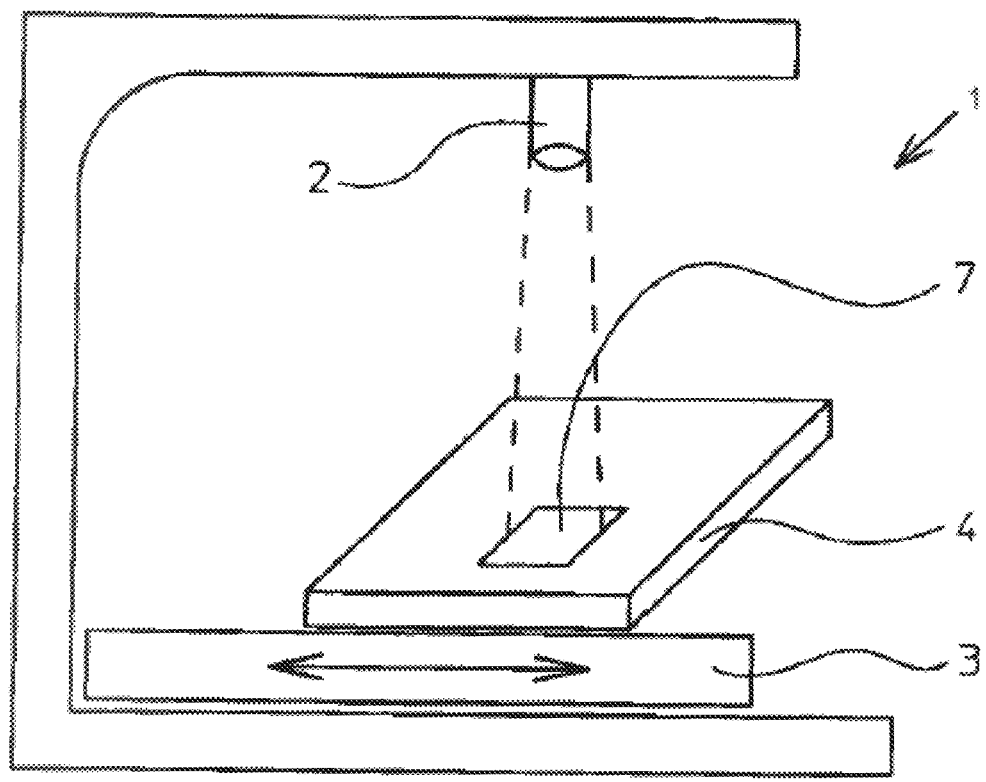
Figure 17:
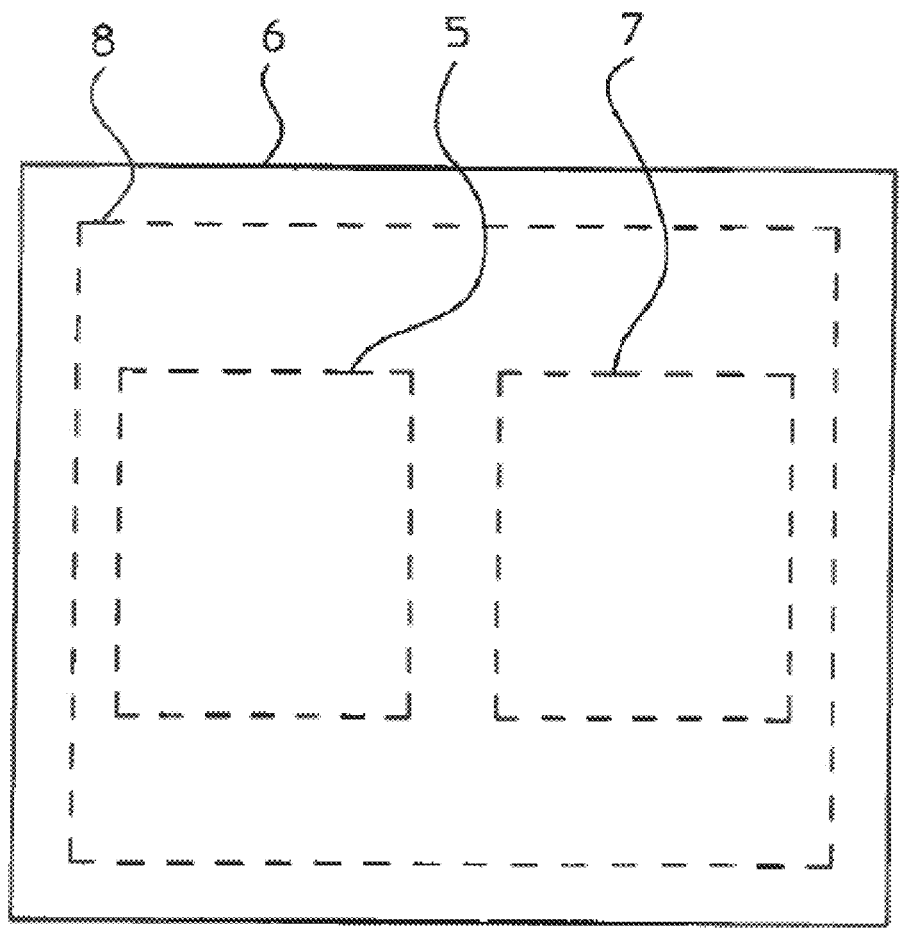

FIG. 1 shows a view according to the prior art, recorded with a standard integration time, FIGS. 2a)-c) show individual views, recorded with integration times that are shorter than the standard integration times, FIGS. 3a)-c) show an alignment of the individual images according to FIG. 2 to a common pixel grid, FIGS. 4a)-c) show the aligned individual images according to FIG. 3, delimited to the same region, FIG. 5 shows an overall image generated by superposition of the gray value amplitudes of the images 4a)-c), FIG. 6 shows the section to be measured of a component, FIG. 7 shows the position of the camera images recorded according to the prior art, FIG. 8 shows the individual views from FIG. 7 and the assembly thereof, FIG. 9 shows the distribution of additional camera images in the region of the section to be determined, FIG. 10 shows individual images from FIG. 9, FIG. 11 shows the position of the individual images from FIG. 7 and FIG. 9, FIG. 12 shows the individual images from FIG. 11 and the assembly into the overall image, FIG. 13 shows a measurement arrangement with a photosensitive detection device in a basic representation, FIG. 14 shows a basic representation of a coordinate measurement apparatus, FIG. 15 shows a basic representation of a display unit, FIG. 16 shows the basic representation of the coordinate measurement apparatus in a second position of a measurement object, and FIG. 17 shows a basic representation of an overall image.

FIG. 1 shows a blurry image which is produced if, during a relatively long integration time (such as, for example, a standard integration time of 15 or 20 milliseconds), the measurement object, here an object edge, is moved by varying amounts relative to the optical sensor, such as a camera. This can be triggered by vibrations of the measurement apparatus, or intentionally on the basis of an optical measurement during the movement. The determination of the position of the edge, that is of the transition between the dark and the bright region in the image can occur only with low precision.

FIGS. 2a) to c) show three views of the approximately identical section of the object, particularly of the same object edge as in FIG. 1, which were recorded immediately one after the other, but with clearly shorter integration times than 20 milliseconds, such as, for example, 5 milliseconds. The views now show a sharp reproduction of the edge, but with darker images owing to the shorter integration time. Owing to the reduced brightness, a detection of the edge is not possible or it leads to large measurement deviations under some circumstances.

FIG. 3 shows the shift according to the invention of the individual images a) to c) to a common pixel grid. In this case, the position of the image of FIG. 3b) was selected as a reference. FIG. 3a) thus shows the image of FIG. 2a) shifted to the right, and FIG. 3c) shows the image of FIG. 2c) shifted to the left. The shift was carried out on the basis of the position determined by the coordinate measurement apparatus and assigned to the individual images of FIGS. 2a) to 2c). Alternatively or additionally, the position shift between the images of FIGS. 2a) to 2c) can also be determined by correlation methods. In order to be able to add, in the later step, the gray value amplitudes of the pixels, the shift to an exactly identical pixel grid, in this case the pixel grid of the image of FIG. 2b) or 3b), occurs using resampling methods. The represented image region of the images of FIGS. 3a) and c) was limited to the size of the image according to FIG. 3b).

FIG. 4 shows the images that have been shifted according to the invention and additionally limited to the region contained in all three partial images of FIG. 2a) to c) or 3a) to c).

In FIG. 5, the superposition of the gray value amplitudes of the respective pixels of FIGS. 4a) to 4c) can now occur in the last step, and the result is a sharp reproduction of the object or of the object edge. From this reproduction, an edge recognition or alternatively a brightness or contrast evaluation in the case of auto focus methods can occur with very high precision, since the mean brightness of the image in FIG. 5 corresponds to the cumulative brightness of the three individual images, and in this case is thus equivalent to an image that was recorded with an integration time of 15 milliseconds, but does not have image blurring, which in the prior art occurs in the case of a relative movement between an object and a sensor with a standard integration time.

Analogous to the method described in FIGS. 1 to 5 for the measurement with shorter integration times and superposition to reduce noise, in FIGS. 6 to 12 a method is explained in greater detail in which the individual views assembled into the overall image are superposed only partially or not at all.

Here, FIG. 6 shows a component which is to be optically determined in the region of the section marked by the small light box.

FIG. 7 shows how this occurs in the prior art, for example, with two individual recordings, marked by a rectangle with dotted lines for the first recording and a rectangle with broken lines for the second recording. These two individual images are represented in FIGS. 8a and b. At the time of the assembly to form an overall image, the image represented in FIG. 8c is formed. Since the individual views produced from FIGS. 8a and b were already recorded with a lower integration time, the resulting image according to FIG. 8c is relatively dark.

FIG. 9 shows, marked by three white rectangles, the partial regions in the image in which additional images are recorded. The recorded individual images are represented in FIGS. 10a, b and c.

FIG. 11 shows all the partial images recorded in this Example 5, marked by the three rectangles and the two rectangles drawn with dotted or broken lines, respectively. Here, one can see that the individual views in each case overlap by 50%. The resulting individual views are represented in FIGS. 12a to 12e. The overlap between the images a and b, b and c, c and d, and d and e is in each case approximately 50%. If one adds the gray value amplitudes of the superposition regions, one gets the overall image represented in FIG. 12f for the regions in which there is superposition. The left half in FIG. 12a and the right half of the individual image represented in FIG. 12e were not used for the evaluation, because here there was no superposition. Alternatively, a normalization or scaling can be carried out, in this case a doubling of the gray value amplitudes in these missing regions, and they too can be added to the overall image.

This overall image is represented in FIG. 12g. One can see that the regions which originate from the left half of FIG. 12a and the right half of FIG. 12e have a higher noise level.

The same procedure is also possible if the component surface is curved. For this purpose, the individual views are determined, for example, in different positions of rotation of the component. If the regions in the image are subsequently rectified in accordance with the existing curvature, then, at the time of the superposition of the individual recordings, a point grid that is equidistant due to the resampling is formed, preferably on a developed representation of the outside surface of, for example, a cylindrical component.

The method represented in FIGS. 6 to 12 is equally possible in the case of degrees of overlap greater than or also less than 50%. For this purpose, for each object region either several images are superposed, whose gray value amplitudes are added, or no superposition occurs and there is a corresponding scaling of the gray values.

FIG. 13 shows an optical sensor referred to as optical reproduction system 910, previously also referred to as a camera, which is connected to a matrix-shaped photosensitive detection device 911 and which is used for measuring a rotosymmetrical measurement object 913 attached to a rotary axle 912. Because of the surface curvature of the measurement object 913, in each case only a portion of the features of the measurement object 913 is represented sharply on the detection device 911. Depending on the depth of field of the optical reproduction system 910, only the features 914, for example, are represented sharply in a defined position of rotation. The features 915 are therefore reproduced sharply earlier in a rotation step, and the features 916 later in a rotation step. Since, in the embodiment example, the features 914 are reproduced sharply, and to make it possible to evaluate them properly, it is sufficient to evaluate the region of the detection device 911 between the lines 917 and 918 of the detection device 911, and to transmit them to an evaluation device. In this way clearly higher repetition rates of the detection device are again achievable.

In this example, it can be assumed that the sharply reproduced portion of the measurement object 913, assuming a corresponding true running of the measurement object, remains in a fixed position in the image region of the photosensitive detection device 911. Therefore, it is appropriate to define a fixed position of the measurement window during the programming of the course of the measurement.

In this measurement procedure applied to the rotosymmetrical measurement object 913 as well, in accordance with the teaching of the invention, individual images are recorded in such a manner that individual images overlap at least partially, in order to make it possible to use the overlapping region during an evaluation.

FIG. 14 shows, in a merely basic manner, a coordination measurement apparatus 1 with image processing sensor 2, such as a camera, in particular a CCD or CMOS camera, and a manual positioning axle 3 as well as a measurement object 4 in a first position. The reference numeral 5 denotes the region of the measurement object 4, which is detected by the image processing sensor 2 in this position. The latter object is represented in the display unit 6 shown in FIG. 15 first in a full screen size.

FIG. 16 shows the coordinate measurement apparatus of FIG. 14 in a second position of the measurement object 4. This position has been assumed because the operator has actuated the manual drives of the positioning axle 3. Now, the region 7 of the measurement object is detected by the image processing sensor 2. On the basis of the modified measurement position displayed by the change of the position determined by the scale systems of the positioning axle 3, it is detected that an as yet non determined region 7 of the measurement object 4 is being determined by the image processing sensor 2, and the recorded individual image is selected and assembled with the already selected individual image of the region 5 using resampling methods to form an overall image 8.

FIG. 17 shows the representation of the overall image 8 from the regions 5 and 7 of the measurement object on the display unit 6. The representation occurs in a scaled manner, so that all the recorded regions are visible.

At first the overall image consists only of the regions 5 and 7, since no additional data on the region of the overall image 8 are available.

According to the invention, alternatively, consecutive images are recorded with the image processing sensor 2, that is including in the positions between the first position of FIG. 14 and the second position of FIG. 16, particularly during the movement of the positioning axle 3. The recorded images are superposed in accordance with their position, and they fill the overall image 8 piece by piece. The greatest image sharpness for the images recorded during the movement is achieved by having the camera of the image processing sensor exposed only briefly, and the required brightness is achieved by the superposition of the partial images according to the invention.

The invention claimed is:

1. A method for generating and evaluating an image of at least one section of an measurement object, the method comprising:
   providing a coordinate measurement apparatus with a multi-pixel camera, wherein the coordinate measurement apparatus is used which provides means for the relative movement between the measurement object and the camera, and into which the camera is integrated;
   wherein, of the at least one section, individual images deviating in their positions from one another are recorded in such way that at least several individual images in each case at least partially overlap in such manner that, for generating the image, the individual images, or signals thereof, are aligned with respect to one another, with respect to at least one section, and are superposed to form an overall image as the image of the at least one section, such image being greater than an individual image;
   wherein the spatial position of the individual images with respect to one another is determined with the aid of the camera position, determined for each individual recording,
   wherein the relative positions between the measurement object and camera are determined on the basis of the positions of the axes of the coordinate measurement apparatus, and the individual images are shifted with respect to one another in consideration of such relative positions, and are superimposed to form the overall image;
   wherein the evaluation of the overall image is substantially limited to the overlapping regions of the individual images, and/or the evaluation of the overall image, or of a portion thereof, occurs on the basis of the overlapping regions of the individual images comprising said regions,
   wherein the gray values of the overlapping sections are added for forming the overall image; and
   wherein object points and/or contours and/or dimensions of the measurement object are determined from the image.

2. The method according to claim 1, wherein individual images of several sections of the object are recorded, of which at least a few images overlap.

3. The method according to claim 1, wherein, for generating the image, the spatial position of the individual recordings with respect to one another is taken into consideration.

4. The method according to claim 1, wherein an integration time $T_{total}$ is assigned to the image, wherein n individual images with integration times $T_1, \ldots, T_n$ are recorded, where $T_1, \ldots, T_n$, and the individual images are superposed, wherein the spatial position of the individual images with respect to one another is determined and taken into consideration in the superposition.

5. The method according to claim 1, wherein, for the purpose of evaluating the overall image, exclusively the regions of the individual images which are contained in all of the individual images are taken into consideration.

6. The method according to claim 1, wherein, for the purpose of evaluating the overall image, all of the individual images independently of any overlap are taken into consideration.

7. The method according to claim 1, wherein the overlapping regions of the sections is less than 100%.

8. The method according to claim 1, wherein the superposition occurs by an addition of intensities or the gray values of the pixels of the individual recordings.

9. The method according to claim 8, wherein the superposition occurs by averaging the intensities or gray values of the pixels of the individual recording, which correspond to one another in terms of position.

10. The method according to claim 9, wherein the resulting gray values are spread using a factor which corresponds at most for one pixel to the number of gray values in the overall image that is used for the superposition.

11. The method according to claim 10, wherein the resulting gray values are spread by division.

12. The method according to claim 1, wherein, before the superposition, the spatial position offset between the individual recordings is corrected by shifting and/or rotating, at least in the image plane of the individual recordings.

13. The method according to claim 1, wherein the image generated from the individual recordings contains only the overlapping image sections which are present in all the individual recordings.

14. The method according to claim 1, wherein, in the superposition, a weighting of the regions occurs, in which at least one of the individual images used for the superposition is located in the marginal region.

15. The method according to claim 1, wherein, after the correction of the position offset between the individual recordings, the pixels of all the used individual recordings are converted into a common point grid by resampling, wherein, for each target pixel, the gray value is calculated from the gray values of the surrounding pixels.

16. The method according to claim 15, wherein the pixels are converted into an equidistant point grid.

17. The method according to claim 15, wherein the gray value is calculated by linear interpolation methods or averaging methods.

18. The method according to claim 1, wherein, in each case, several individual recordings are recorded immediately after one another, wherein each individual recording with a shorter integration time T than a standard integration time of 20 milliseconds.

19. The method according to claim 1, comprising using an entire region, a partial region, or several partial regions, of a detection surface of the camera.

20. The method according to claim 1, wherein the selected individual images overlap.

21. The method according to claim 1, wherein the selected individual images are assembled using resampling methods, in order to form an overall image, and are made available for further evaluation.

22. The method according to claim 21, wherein the individual images are represented on a display unit, in developed form, in the case of rotation symmetrical components.

23. The method according to claim 22, wherein the individual images are scaled in adaptation to a size of the display unit.

24. The method according to claim 1, wherein the camera is a CCD camera or a CMOS camera.

* * * * *